No. 743,427. Patented November 10, 1903.

UNITED STATES PATENT OFFICE.

CHARLES LINMAN BECK, OF TOWANDA, PENNSYLVANIA, ASSIGNOR, BY MESNE ASSIGNMENTS, TO TOWANDA PAINT REMOVER COMPANY, OF TOWANDA, PENNSYLVANIA, A CORPORATION OF PENNSYLVANIA.

COMPOSITION FOR REMOVING PAINT OR VARNISH.

SPECIFICATION forming part of Letters Patent No. 743,427, dated November 10, 1903.

Application filed July 23, 1902. Renewed September 16, 1903. Serial No. 173,477. (No specimens.)

*To all whom it may concern:*

Be it known that I, CHARLES LINMAN BECK, a citizen of the United States, residing at Towanda, in the county of Bradford and State of Pennsylvania, have invented a certain new and useful Improvement in Compositions of Matter for Removing Paint or Varnish; and I do hereby declare the following to be a full, clear, and exact description of the invention, such as will enable others skilled in the art to which it appertains to make and use the same.

This invention relates to a composition of matter especially adapted for use in removing paint and varnish from wood and other surfaces; and the object is to provide a simple and inexpensive composition which when mixed with water or other suitable liquid will form a quick-acting and efficient paint-remover and one that will not thicken in the can nor dry nor harden on the painted surface too quickly and which may be used without injurious effects, leaving the wood or other surface to which it is applied clean and smooth.

My composition consists of the following ingredients combined in suitable proportions, viz: lime, carbonate of soda, and sodium chlorid or common salt. These are preferably compounded in substantially the proportion of five parts, by weight, of lime to one of sodium carbonate and one of common salt, which have been found to give the best results; but it will be understood that the proportions given may be varied as may be found desirable.

In making this composition the lime, preferably in a crumbling state, is reduced to powder or pulverized by means of a suitable grinding-machine, and in this condition the lime is mixed with the sodium carbonate and salt and all the ingredients are thoroughly commingled. The mass may then be passed through a grinding-machine, and thus more finely pulverized and more thoroughly mixed and blended. The powder thus produced may be put up and sold in cans or packages of any suitable size.

In using the composition it is first mixed with water or other suitable liquid until the mass has about the consistency of a thin syrup and is then applied to the surface from which the paint or varnish is to be removed. The product resulting from the mixture of water with the lime and carbonate of soda attacks and removes the paint instantly, and the salt maintains the consistency of the mass uniform, prevents thickening in the can and speedy drying and hardening when applied to a painted surface, increases the solvent action, and causes the painted surface to be left clean and smooth.

The liquid compound may be applied to the painted surface by a brush or other suitable means, and after its action takes place the surface may then be cleaned by water, using a brush, hose, or cloth, as convenient.

Other suitable ingredients may also be incorporated in the powder, if desired, for the purpose of coloring the compound and giving a pleasant odor.

Having thus fully described my invention, what I claim as new, and desire to secure by Letters Patent of the United States, is—

The herein-described composition of matter, for removing paint and varnish from wood and other surfaces, the ingredients of which are lime, carbonate of soda, and common salt, combined in substantially the proportions of five parts by weight of lime to one of carbonate of soda and one of salt, and water in suitable proportions.

In testimony whereof I affix my signature in presence of two witnesses.

CHARLES LINMAN BECK.

Witnesses:
L. M. OSBORNE,
M. M. SPALDING.